United States Patent [19]
Miyake et al.

[11] 3,951,886
[45] Apr. 20, 1976

[54] PROCESS FOR PRODUCING POLYESTER RESIN
[75] Inventors: Hideo Miyake; Osamu Makimura; Toshio Tsuchida, all of Otsu, Japan
[73] Assignee: Toyo Boseki Kabushiki Kaisha, Osaka, Japan
[22] Filed: Mar. 22, 1974
[21] Appl. No.: 453,955

[30] Foreign Application Priority Data
Mar. 22, 1973 Japan.............................. 48-33309

[52] U.S. Cl. .............................. 260/2.3; 260/75 T; 260/75 UA; 260/75 R; 260/475 D; 260/475 P; 260/485 G; 260/861
[51] Int. Cl.² .................. C08J 11/04; C08G 63/76
[58] Field of Search .............. 260/2.3, 75 T, 75 R, 260/475 D, 475 P, 485 G

[56] References Cited
UNITED STATES PATENTS
3,703,488  11/1972  Morton .............................. 260/2.3
3,830,759  8/1974  Barkey .............................. 260/2.3

FOREIGN PATENTS OR APPLICATIONS
4,606,433  2/1971  Japan .............................. 260/75 R
4,603,395  1/1971  Japan .............................. 260/75 R Primary Examiner—Wilbert J. Briggs, Sr.
Attorney, Agent, or Firm—Stewart and Kolasch, Ltd.

[57] ABSTRACT

A process for producing polyester resins, such as saturated polyester resin, alkyd resin and unsaturated polyester resin from polyester wastes, which comprises depolycondensing polyester wastes with at least one polyol in the presence of at least one titanyl oxalate compound and/or titanium tartrate compound and subsequently polycondensing the resulting depolycondensation product with at least one polycarboxylic acid or its anhydride or with at least one polycarboxylic acid or its anhydride and at least one polyol, optionally in the presence of at least one phosphorus compound.

14 Claims, No Drawings

PROCESS FOR PRODUCING POLYESTER RESIN

The present invention relates to a process for producing polyester resins. More particularly, it relates to a process for reproducing polyester resins from polyester wastes.

Polyesters have been widely used in various fields such as fiber products, molding materials, films, adhesives, coating materials, varnishes, and plasticizers. In the processes of the production of such products, there usually occur by-products of various polyester wastes. Accordingly, it has hitherto been studied to use again the by-produced polyester wastes.

For using economically the polyester wastes, there have, hitherto, been known some methods, such as (1) by utilizing the polyester wastes as they are for some purposes, (2) by depolycondensing the polyester wastes to give starting materials useful for reproduction of new polyesters, and (3) by reacting the polyester wastes with polyols or polycarboxylic acids to give new polyesters.

Among the above methods, the method (3) comprises depolycondensing the polyester waste by reacting with a polyol or polycarboxylic acid in the presence of a catalyst or without a catalyst and then polycondensing the resultant to give a polyester (Japanese Patent Publication Nos. 3995/1964, 6197/1967, 1471/1970, 15114/1971 and 10057/1972). However, when the depolycondensation is carried out by reacting the polyester waste with a polycarboxylic acid or its anhydride, not only does it require a long reaction time, but also the reaction product is significantly colored, and furthermore gelatin occurs in the course of reaction in many cases. Moreover, the polycarboxylic acid or its anhydride is easily dissipated from the reaction mixture by sublimation or the like. On the other hand, when the depolycondensation is carried out by using a polyol, the reaction is usually carried out at 200°C or a higher temperature, since it more easily proceeds at a higher temperature. However, too high of a temperature induces the coloration and gelation of the product and further the increase of the amount of the by-products. Accordingly, the depolycondensation reaction is usually carried out at a comparatively low temperature, for instance, at 200° to 240°C, but at such temperature the reaction requires a longer time.

In order to solve such problems, it has been proposed to use certain catalysts, such as alkali metal or alkaline earth metal compounds (e.g. hydrooxide, oxide, acid salt or alcoholate), lead compounds (e.g. oxide or acetate), zinc compounds (e.g. oxide, acetate or chloride), magnesium compounds (e.g. oxide or acetate), cobalt compounds (e.g. oxide, acetate or chloride), cadmium compounds (e.g. oxide or acetate), manganese compounds (e.g. oxide, acetate or chloride), antimony trioxide, iron compounds (e.g. oxide or acetate), nickel compounds (e.g. oxide or acetate), zirconium compounds (e.g. oxide or acetate), cerium compounds (e.g. oxide or acetate) and tetraalkyl titanate, but most of them are insufficiently effective.

It has been reported that when zinc chloride, manganese chloride, cobalt chloride or tetrabutyl titanate is used in depolycondensation of polyethylene terephthalate waste with ethylene glycol, it can not reduce the reaction time to half. Although these catalysts are used in a large amount as 1% by weight (1 part by weight of them on the basis of 100 parts by weight of polyethylene terephthalate waste), the effect is weak. It has further been reported that when a tetraalkyltitanate of the formula: $Ti(OR_1)(OR_2)(OR_3)(OR_4)$ or a hydrolyzate of titanium chelate compound of the formula:

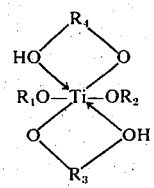

is used as a catalyst, the reaction time is reduced to one third in comparison with the reaction without catalyst (Japanese Patent Publication No. 23449/1968). However, according to the above method, the catalyst is used also in a large amount as 1 part by weight on the basis of 100 parts by weight of polyethylene terephthalate waste (i.e. 1% by weight). Furthermore, the catalyst is insoluble in the reaction mixture and therefore it must be dispersed in the reaction mixture by a certain specific means. Moreover, the insoluble catalyst is difficult to remove from the reaction product.

Under the circumstances, it has been studied to discover superior catalyst which are useful for reducing the reaction time of the depolycondensation reaction and further can give a colorless depolycondensation product without by-products even by use of a very small amount, and finally it has been discovered that titanyl oxalate compounds and titanium tartrate compounds are very useful for this purpose.

An object of the present invention is to provide a process for producing polyester resins from polyester wastes.

Another object of the present invention is to provide a process for depolycondensing polyester wastes in the presence of at least one titanyl oxalate compound and-/or titanium tartrate compound as catalyst to give colorless depolycondensation products without by-products.

A further object of the invention is to provide a process for reducing the reaction time of the depolycondensation reaction by using at least one titanyl oxalate compound and/or titanium tartrate compound as catalyst.

A still further object of the invention is to provide a process for producing colorless polyester resins from the depolycondensation products.

These and other objects will be apparent from the description hereinafter.

According to the present invention, a polyester waste is depolycondensed with at least one polyol in the presence of at least one titanyl oxalate compound and/or titanium tartrate compound and the resulting depolycondensation product is reacted with at least one polycarboxylic acid or its anhydride or with at least one polycarboxylic acid or its anhydride and at least one polyol to give a polyester resin.

The polyester of the present invention means a polyester comprising polyol component(s) and polycarboxylic acid component(s) and containing ester bonds in the molecule which are formed by polycondensing at least one polyol and at least one polycarboxylic acid or its anhydride.

The examples of the polyol may be diols such as alkylene glycols (e.g., ethylene glycol, 1,2-propylene glycol, 1,3-butylene glycol, trimethylene glycol, 1,4-butanediol, pentamethylene glycol, 1,6-hexanediol, neopentyl glycol, 2,2,4-trimethyl-1,3-pentanediol or 1,4-butenediol), polyalkylene glycols (e.g. diethylene glycol, dipropylene glycol, polyethylene glycol or polypropylene glycol), cycloalkylene glycols (e.g. cyclohexanediol or cyclohexanedimethanol) or aromatic diols (e.g. hydrogenated bisphenols, alkylene oxide addition products of hydrogenated bisphenols, alkylene oxide addition products of bisphenols or alkylene oxide addition products of halogenated bisphenols); triols (e.g. trimethylolethane, trimethylolpropane or glycerine); tetraols (e.g. pentaerythritol); or the like.

The examples of the polycarboxylic acid or its anhydride may be saturated dicarboxylic acids or their anhydrides (e.g. orthophthalic acid or its anhydride, isophthalic acid, terephthalic acid, alkylated phthalic acids or their anhydrides, naphthalenedicarboxylic acid, succinic acid or its anhydride, adipic acid, azelaic acid, sebacic acid, dodecanedicarboxylic acid, tetrahydrophthalic acid or its anhydride, hexahydrophthalic acid or its anhydride, halogenated phthalic acids or their anhydrides, or 3,6-endomethylene-1,2,3,6-tetrahydrophthalic acid or its anhydride), unsaturated dicarboxylic acids or their anhydrides (e.g. chlorendic acid or its anhydride, fumaric acid, maleic acid or its anhydride, citraconic acid or itaconic acid), tricarboxylic acids or their anhydrides (e.g. trimellitic acid or its anhydride), tetracarboxylic acids or their anhydrides (e.g. pyromellitic acid or its anhydride), or the like.

The polyester resin in the present invention includes a saturated polyester resin, an alkyd resin and an unsaturated polyester resin. The saturated polyester resin is produced, when both the polycarboxylic acid component of the starting polyester waste and the reaction polycarboxylic acid used in the polycondensation reaction are saturated dicarboxylic acids and both the polyol component of the starting polyester waste and the reactant polyol used in the polycondensation reaction are saturated diols. The alkyd resin is produced, when the polycarboxylic acid or/and the polyol which are either the component of the starting polyester waste or the reactant used in the polycondensation reaction is trivalent or more polyvalent. Besides, when either of the polycarboxylic acid component or polyol component of the starting polyester waste and the reactant polycarboxylic acid or polyol used in the polycondensation reaction is an unsaturated dicarboxylic acid or unsaturated diol, an unsaturated polyester is produced. The unsaturated polyester is mixed with at least one vinyl monomer or allyl monomer to give the unsaturated polyester resin. The examples of the vinyl monomer and allyl monomer may be styrene, vinyltoluene, ethylstyrene, divinylbenzene, monochlorostyrene, tert.-butylstyrene, α-methylstyrene, methyl acrylate, methyl methacrylate, diallyl phthalate, diallyl fumarate, dibutyl fumarate, triallyl cyanurate, vinyl acetate, or the like.

The examples of the titanyl oxalate compound and the titanium tartrate compound used in the present invention may be ammonium titanyl oxalate, lithium titanyl oxalate, sodium titanyl oxalate, potassium titanyl oxalate, magnesium titanyl oxalate, calcium titanyl oxalate, strontium titanyl oxalate, barium titanyl oxalate, manganese titanyl oxalate, cobalt titanyl oxalate, zinc titanyl oxalate, lead titanyl oxalate, ammonium titanium tartrate, lithium titanium tartrate, sodium titanium tartrate, potassium titanium tartrate, magnesium titanium tartrate, calcium titanium tartrate, strontium titanium tartrate, barium titanium tartrate, manganese titanium tartrate, cobalt titanium tartrate, zince titanium tartrate, lead titanium tartrate, or the like. Among them, potassium titanyl oxalate, ammonium titanyl oxalate, calcium titanyl oxalate, potassium titanium tartrate, sodium titanium tartrate are most preferred. These titanyl oxalate compounds and titanium tartrate compounds may be used alone or together therewith.

The titanyl oxalate compounds and titanium tartrate compounds are soluble in the depolycondensation reaction mixture and therefore it is not necessary to take a specific means for dispersing the catalyst into the reaction mixture as with the conventional catalyst.

The titanyl oxalate compounds and titanium tartrate compounds of the present invention are effective in a very small amount. That is, the catalyst is effective in so small an amount as about 0.005% by weight, but it is preferable to use an amount of about 0.01 to 0.1% by weight on the basis of the weight of the polyester waste. The catalyst may be, of course, added in a greater amount than the above range, but it is not necessary to do so from the practical viewpoint. When the titanyl oxalate compounds and/or titanium tartrate compounds are added to the reaction mixture in an amount of about 0.01 to 0.1% by weight, the reaction time of the depolycondensation reaction can be reduced to about 1/5 to 1/10 or smaller in comparison with that without the catalyst. When the reaction temperature is lower, the difference of the reaction time between the depolycondensation reaction by the present invention and the reaction without catalyst is much enlarged. When the depolycondensation reaction is carried out at about 210°C without catalyst, the reaction proceeds extremely slowly, but on the other hand, when the reaction is carried out at the same temperature in the presence of the titanyl oxalate or titanium tartrate compound of the present invention, the reaction is completed in a very short time. According to the present invention, the reaction temperature can be lowered. Generally, the reaction may be preferably carried out at about 210° to 240°C. The reaction may be carried out under an atmosphere of an inert gas, but it is not necessary to do so. Besides, the reaction may be usually carried out under atmospheric pressure, but when the polyol is the one having a comparatively low boiling point, such as ethylene glycol or propylene glycol, it is preferably carried out under pressure.

For reducing the reaction time, the depolycondensation reaction of the polyester is usually carried out at a higher temperature by using a large excess amount of polyol. According to the present invention, however, the polyol may be used in such an excess amount as about 1.05 to 2.0 mol to 1 mol of the polyester waste. It may be also used in an amount smaller or larger than the above range. However, it is not preferable to use the polyol in an unnecessarily large excess amount, because the depolycondensation product is used for the subsequent process for reproducing polyester and the depolycondensation product containing a very large amount of free polyol is not suitable for this purpose.

The examples of polyol used in the depolycondensation reaction may be diols such as alkylene glycols (e.g. ethylene glycol, 1,2-propylene glycol, trimethylene glycol, 1,3-butylene glycol, 1,4-butanediol, pentamethylene glycol, 1,6-hexanediol, neopentyl glycol, 2,2,4-trimethyl-1,3-pentanediol or 1,4-butenediol), polyalkylene glycols (e.g. diethylene glycol, dipropylene glycol, polyethylene glycol or polypropylene glycol), cycloalkylene glycols (e.g. cyclohexanediol or cyclohexanedimethanol), or aromatic diols (e.g. dimethylolbenzene, hydrogenated bisphenols, alkylene oxide addition products of hydrogenated bisphenols, alkylene oxide addition products of bisphenols or alkylene oxide addition products of halogenated bisphenols); triols (e.g. trimethylolethane, trimethylolpropane, glycerine or trimethylolbenzene); tetraols (e.g. pentaerythritol); sorbitol; mannitol; thioglycol; or the like. These polyols may be used alone or together in accordance with the desired characteristics and properties of the reproduced polyester resin.

The polyester waste used in the present invention may contain other ingredients, such as glass fibers, fillers (e.g. calcium carbonate, clay or aluminum hydroxide), pigments (e.g. titanium oxide, carbon black or phthalocyanine blue), ultraviolet light absorbers, spinning oils, cotton, rayon, or the like.

The depolycondensation product obtained from the polyester waste is then subjected to the subsequent polycondensation reaction with at least one polycarboxylic acid or its anhydride or with at least one polycarboxylic acid or its anhydride and at least one polyol to give a polyester resin.

The polyols used in the polycondensation reaction may be the same as those used in the depolycondensation reaction. The examples of the polycarboxylic acid or its anhydride may be saturated dicarboxylic acids or their anhydrides (e.g. orthophthalic acid or its anhydride, isophthalic acid, terephthalic acid, alkylated phthalic acids, naphthalenedicarboxylic acid, succinic acid or its anhydride, adipic acid, azelaic acid, sebacic acid, dodecanedicarboxylic acid, tetrahydrophthalic acid or its anhydride, hexahydrophthalic acid or its anhydride, halogenated phthalic acids or their anhydrides, or 3,6-endomethylene-1,2,3,6-tetrahydrophthalic acid or its anhydride), unsaturated dicarboxylic acids or their anhydrides (e.g. chlorendic acid or its anhydride, fumaric acid, maleic acid or its anhydride, citraconic acid or itaconic acid), tricarboxylic acids or their anhydrides (e.g. trimellitic acid or its anhydride), tetracarboxylic acids or their anhydrides (e.g. pyromellitic acid or its anhydride), or the like.

The titanyl oxalate compound and titanium tartrate compound used in the depolycondensation reaction is contained in the depolycondensation product and may be also effective in the subsequent polymerization reaction as a catalyst, when a saturated polycarboxylic acid such as isophthalic acid, terephthalic acid, naphthalenedicarboxylic acid, trimellitic acid, pyromellitic acid, or the like is used as the polycarboxylic acid.

The polycondensation of the depolycondensation product may be carried out by a conventional process. The polycondensation reaction may be usually carried out at a temperature of 150° to 290°C, under pressure, atmospheric pressure or reduced pressure and optionally under an atmosphere of an inert gas. Furthermore, any suitable catalyst may be used in the reaction. The polycondensation reaction may be usually carried out in a molten state process and may be in a solution process. The optimum conditions may be optionally decided in accordance with the desired characteristics and properties of the final polyester resin.

The final polyester resin may be occasionally colored depending on the kind of the starting polyester waste. The product may be sometimes required to be colorless, and therefore, in such case, it is necessary to prevent the coloring of the final product. It has also been studied to prevent the coloration of the final product, and it has been found that the coloration of the product can be prevented by adding a small amount of phosphorus compound in the polycondensation reaction mixture.

The phosphorus compound used in the present invention includes hypophosphorous acid, phosphorus acid or phosphoric acid, or their alkyl or aryl esters, such as trimethyl phosphite, triethyl phosphite, triphenyl phosphite, trimethyl phosphate, triethyl phosphate, triphenyl phosphate, diethylphenyl phosphate, trioctyl phosphate, trioctyl phosphite, trioctadecyl phosphate, trioctadecyl phosphite, polyphosphate, polyphosphonate, or the like.

The phosphorus compound may be added as a solution is an appropriate solvent such as water or polyol. The phosphorus compound may be added in a small amount and usually in an amount of 0.0005 to 0.5% by weight, preferably 0.001 to 0.05% by weight (calculated as phosphorus atom) on the basis of the weight of the depolycondensataion product.

The polyester resin reproduced from the polyester wastes of the present invention can be used in various fields like the conventional saturated polyester resin, alkyd resin and unsaturated polyester resin, for instance, molding materials, films, adhesives, coating materials, varnishes, plasticizers, FRP molded products, composites, sheet molding compounds, bulk molding compounds, premix molding compounds, prepregs, or the like.

The present invention is illustrated by the following Examples but is not limited thereto.

In the Examples, the low molecular weight oligomer contained in the depolycondensation product is defined by its mean degree of polycondensation, which was calculated as follows:

Each amount of the free polyol(s) contained in the depolycondensation product was measured by gas chromatography (type 5AP$_5$, Shimadzu Seisakusho Ltd.) and was individually deduced from each total amount of the polyol component(s) contained in the polyester waste and polyol(s) used in the depolycondensation reaction to give each amount of polyol(s) contained in the oligomer, from which the mean degree of polycondensation was calculated.

The intrinsic viscosity was measured in a solution of phenol/tetrachloroethane: 6/4 by weight and at 30°C. PHR means part(s) by weight per 100 parts of resin.

EXAMPLE 1

A stainless steel autoclave equipped with stirrer, thermometer, nitrogen gas-introducing tube and partial condenser was charged with pellets (960 g) made from polyethylene terephthalate molding material waste, and thereto were added neopentyl glycol (572 g) and potassium titanyl oxalate (0.5 g). The mixture was heated under nitrogen gas while raising the temperature to 210°C during 30 minutes and then reacted at 210°C for 1.5 hours to give a homogeneous reaction product containing oligmomer having a mean degree of polycondensation of 1.6.

To the reaction product thus obtained was added sebacic acid (337 g) and the mixtures was reacted at 220°C for 30 minutes. After the pressure was reduced to atmospheric pressure, the mixture was further reacted at 250°C for 30 minutes. The pressure of the reaction atmosphere was gradually reduced and finally to below 1 mmHg, and then the mixture was further reacted at 280°C for 30 minutes to give yellow polyester resin (intrinsic viscosity: 0.65).

The polyester resin thus obtained has a softening point of 114°C (JIS K 2421) and was easily soluble in methyl ethyl ketone, 30% solution of which showed a Hazen's number of color larger than 500, and was stable for a long period.

Separately, a 20% solution of the above resin in methyl ethyl ketone was prepared. The solution was applied to a stainless steel plate and thereon was adhered a cotton cloth having 1 cm in width, which was dried in vacuum at 60°C for 24 hours and then the peeling strength thereof was tested by a tensile test machine. The result was 1.9 kg/cm$^2$.

A homogeneous reaction product containing oligomer having a mean degree of polycondensation of 1.6 was prepared in the same manner as described above, and thereto was added sebacic acid (337 g), germanium oxide (0.400 g) and hypophosphorous acid (0.300 g), and the mixture was reacted in the same manner as described above to give an almost colorless polyester resin (intrinsic viscosity: 0.68). The resin thus obtained was easly soluble in methyl ethyl ketone and 30% solution thereof showed a Hazen's number of color smaller than 100.

COMPARATIVE EXAMPLE 1

The same autoclave as in Example 1 was charged with pellets (960 g) made from polyethylene terephthalate molding material waste and neopentyl glycol (572 g) and the mixture was heated under nitrogen gas while raising the temperature to 210°C during 30 minutes and then reacted at 210°C. Even after 6 hours, the reaction mixture was highly viscous and turbid and contained a small amount of unreacted pellet, which meant that the depolycondensation reaction was very slow.

When the reaction of Example 1 is compared with that of Comparative Example 1, it is made clear that the potassium titanyl oxalate is extremely effective as a catalyst.

EXAMPLE 2

The same autoclave as in Example 1 was charged with granules of polytetramethylene terephthalate molding materials waste (1,100 g), ethylene glycol (362 g) and ammonium titanyl oxalate (0.5 g). The mixture was heated under a pressure of 3.0 kg/cm$^2$G under nitrogen gas while raising the temperature to 220°C during 30 minutes. When the temperature reached 220°C, the reaction mixture had already become homogeneous. The mean degree of polycondensation of the oligomer contained in the reaction product was 1.8.

After the pressure was reduced to atmospheric pressure, to the reaction product thus obtained was added isophthalic acid (83 g) and the mixture was heated to 250°C and then reacted at 250°C for 30 minutes. The pressure of the reaction atmosphere was gradually reduced and finally to below 1 mmHg, and then the mixture was further reacted at 280°C for 1 hour to give pale yellow polyester resin (intrinsic viscosity: 1.03).

From the resin thus obtained, test pieces were prepared by using an injection molding machine (type N-95, Nippon Seikosho Co.) and then the following physical properties thereof were measured (JIS K 6911):
Heat deformation temperature: 64°C
Tensile strength: 5.3 kg/mm$^2$
Elongation: 280%
Izod impact strength: 5.5 kg·cm/cm$^2$

COMPARATIVE EXAMPLE 2

The same autoclave as in Example 1 was charged with granules of polytetramethylene terephthalate molding materials waste (1,100 g) as used in Example 2 and ethylene glycol (362 g). The mixture was heated under a pressure of 3.0 kg/cm$^2$G under nitrogen gas while raising the temperature to 220°C during 30 minutes and further reacted at 220°C. The turbid mixture became gradually homogeneous. After 2 hours, the oligomer contained in the reaction product had a mean degree of polycondensation of 2.4.

When the reaction of Example 2 is compared with that of Comparative Example 2, it is made clear that the ammonium titanyl oxalate is extremely effective as a catalyst.

EXAMPLE 3

The same autoclave as in Example 1 was charged with chips (960 g) made from polyethylene terephthalate spun yarn waste containing titanium oxide and spinning oils by using an extruder, neopentyl glycol (520 g), ethylene glycol (62 g) and potassium titanium tartrate (0.4 g). The mixture was heated under a pressure of 3.0 kg/cm$^2$G under nitrogen gas while raising the temperature to 220°C during 30 minutes and further reacted at 220°C for 30 minutes to give a homogeneous reaction product containing oligomer having a mean degree of polycondensation of 1.8.

After the pressure was reduced to atmospheric pressure, to the reaction product thus obtained was added trimellitic acid (34 g) and sebacic acid (55 g) and the mixture was heated to 250°C and then reacted at 250°C for 30 minutes. The pressure of the reaction atmosphere was gradually reduced and finally to 2 mmHg during 30 minutes. The reaction mixture was further reacted at 250°C under 0.5 – 0.3 mmHg for 1 hour to give pale yellowish white polyester resin having a softening point of 72° – 73°C.

The resin thus obtained (1,000 g) was pulverized and mixed with pyromellitic anhydride (80 g), titanium oxide (300 g) and butyl acrylate (50 g). The mixture was pelletized at 150°C by using an extruder. The pellets were then pulverized to 120 – 150 mesh. The powder was electrostatically coated in the thickness of 100 μ on a mild steel plate and baked at 200°C for 20 minutes.

The properties of the film thus obtained were measured (JIS K 5400). The results were as follows:
Brightness: 95
Pencil hardness: H
Erichsen value: larger than 7 mm
Impact value (du Pont impact tester; 500 g, ½ inch): larger than 50 cm

COMPARATIVE EXAMPLE 3

The same autoclave as in Example 1 was charged with chips (960 g) made from polyethylene terephthalate spun yarn waste as used in Example 3, neopentyl glycol (520 g) and ethylene glycol (62 g). The mixture was heated under a pressure of 3.0 kg/cm$^2$G under nitrogen gas while raising the temperature to 220°C and further reacted at 220°C. After 2.5 hours, the reaction mixture became homogeneous. The oligomer contained in the reaction product had a mean degree of polycondensation of 2.3.

When the reaction of Example 3 is compared with that of Comparative Example 3, it is made clear that the potassium titanium tartrate is extremely effective as a catalyst.

EXAMPLE 4

The same autoclave as in Example 1 was charged with pellets (1,152 g) made from polyethylene terephthalate film waste containing fumed silica by using an extruder, propylene glycol (502 g) and potassium titanyl oxalate (0.4 g). The mixture was heated under a pressure of 3.0 kg/cm$^2$G under nitrogen gas while raising the temperature to 230°C during 30 minutes. When the temperature reached 230°C, the reaction mixture had already become homogeneous. The oligomer contained in the reaction product had a mean degree of polycondensation of 1.2.

After the pressure was reduced to atmospheric pressure and the temperature was lowered to 180°C, to the reaction product thus obtained was added fumaric acid (696 g) and the mixture was again heated to 210°C and further reacted under nitrogen gas and subsequently under reduced pressure for 5 hours to give an unsaturated polyester having an acid value of 14.

The unsaturated polyester thus obtained was dissolved in styrene so as to have 40% of styrene content to give an unsaturated polyester resin. The resin was somewhat cloudy, because it contained fumed silica, and showed a Hazen's number of color larger than 500.

The resin was mixed with benzoyl peroxide (1.0 PHR), from which a casting plate was made by the conventional method. Test pieces were cut from the casting plate, on which physical properties were measured (JIS K 6919). The results were as follows:
Barcol hardness: 38
Flexural strength: 11.3 kg/mm$^2$
Modulus in flexure: 352 kg/mm$^2$
Heat deformation temperature: 127°C A homogeneous reaction product containing oligomer having a mean degree of polycondensation of 1.2 was prepared in the same manner as described above. After the pressure was reduced to atmospheric pressure and the temperature was lowered to 180°C, the reaction product was homogeneously mixed with triphenyl phosphate (0.15 g) and thereto was added fumaric acid (696 g). The mixture was heated to 210°C and further reacted under nitrogen gas and subsequently under reduced pressure for 5 hours to give an unsaturated polyester having an acid value of 12. the unsaturated polyester thus obtained was dissolved in styrene so as to have 40% of styrene content to give an unsaturated polyester resin having a Hazen's number of color smaller than 100. Thus, the addition of phosphorus compound extremely improved the color of the resin.

COMPARATIVE EXAMPLE 4

The same autoclave as in Example 1 was charged with pellets (1,152 g) made from polyethylene terephthalate film waste as used in Example 4 and propylene glycol (502 g). The mixture was heated under a pressure of 3.0 kg/cm$^2$G under nitrogen gas while raising the temperatue to 230°C during 30 minutes and further reacted at 230°C. After 30 minutes, the oligomer contained in the reaction product had a mean degree of polycondensation of 3.5. After a further 2 hours, the mean degree of polycondensation of the oligomer was 1.8.

When the reaction of Example 4 is compared with that of Comparative Example 4, it is made clear that the potassium titanyl oxalate is extremely effective as a catalyst.

EXAMPLE 5

The same autoclave as in Example 1 was charged with chips (768 g) made from polyethylene terephthalate-isophthalate copolymer (terephthalate : isophthalate = 9 : 1 by mol) spun yarn waste containing titanium oxide and spinning oils by using an extruder, diethylene glycol (466 g) and calcium titanyl oxalate (0.3 g). The mixture was heated under nitrogen gas while raising the temperature to 230°C during 30 minutes. When the temperature reached 230°C, the reaction mixture had already become homogeneous. The oligomer contained in the reaction product had a mean degree of polycondensation of 1.8.

After the temperature was lowered to 180°C, to the reaction product thus obtained was added fumaric acid (928 g) and diethylene glycol (424 g) and the mixture was again heated to 210°C and further reacted under atmospheric pressure and subsequently under reduced pressure for 6 hours to give yellowish white unsaturated polyester having an acid value of 10.

The unsaturated polyester thus obtained was dissolved in styrene so as to have 40% of styrene content to give an unsaturated polyester resin. The resin was mixed with methyl ethyl ketone peroxide (55%; 0.6 PHR) and cobalt naphthenate (Co = 6%; 0.4 PHR), from which a casting plate was made by the conventional method. Test pieces were cut from the casting plate, on which the physical properties were measured (JIS K 6919). The results were as follows:
Barcol hardness: 36
Flexural strength: 11.3 kg/mm$^2$
Modulus in flexure: 321 kg/mm$^2$
Heat deformation temperature: 125°C

COMPARATIVE EXAMPLE 5

The same autoclave as in Example 1 was charged with chips (768 g) made from polyethylene terephthalate-isophthalate copolymer spun yarn waste as used in Example 5 and diethylene glycol (466 g). The mixture was heated under nitrogen gas while raising the temperature to 230°C during 30 minutes and further reacted for 1 hour. The oligomer contained in the reaction product had a mean degree of polycondensation of 3.1. After 2 hours, the mean degree of polycondensation of the oligomer was 2.5.

When the reaction of Example 5 is compared with that of Comparative Example 5, it is made clear that the calcium titanyl oxalate is extremely effective as a catalyst.

EXAMPLE 6

The same autoclave as in Example 1 was charged with pellets (960 g) made from polyethylene terephthalate molding material waste as used in Example 1, dipropylene glycol (804 g) and ammonium titanyl oxalate (0.4 g). The mixture was heated under nitrogen gas while raising the temperature to 220°C during 30 minutes. When the temperature reached 220°C, the reaction mixture had already become homogeneous. The oligomer contained in the reaction product had a mean degree of polycondensation of 1.7.

After the reaction product was cooled to 180°C, to the reaction product was added fumaric acid (580 g) and the mixture was again heated to 210°C and further reacted under atmospheric pressure and subsequently under reduced pressure for 7 hours to give an unsaturated polyester having an acid value of 7.

The unsaturated polyester thus obtained was dissolved in styrene so as to have 40% of styrene content to give an unsaturated polyester resin having a Hazen's number of color larger than 500.

The resin was mixed with benzoyl peroxide (1.0 PHR), from which a casting plate was made by the conventional method. Test pieces were cut from the transparent casting plate, on which the physical properties were measured (JIS K 6919). The results were as follows:

Barcol hardness: 33
Flexural strength: 12.0 kg/mm$^2$
Modulus in flexure: 345 kg/mm$^2$
Heat deformation temperature: 101°C A reaction product containing oligomer having a mean degree of polycondensation of 1.7 was prepared in the same manner as described above. The reaction product was cooled to 180°C and was homogeneously mixed with phosphoric acid (0.5 g) and thereto was added fumaric acid (580 g). The mixture was again heated to 210°C and further reacted under atmospheric pressure and subsequently under reduced pressure for 7 hours to give an unsaturated polyester having an acid value of 10.

The unsaturated polyester thus obtained was dissolved in styrene so as to have 40% of styrene content to give an unsaturated polyester resin having a Hazen's number of color smaller than 100. Thus, the addition of phosphorus compound extremely improved the color of the resin.

COMPARATIVE EXAMPLE 6

The same autoclave as in Example 1 was charged with pellets (960 g) made from polyethylene terephthalate molding material waste as used in Example 1 and dipropylene glycol (804 g). The mixture was heated under nitrogen gas while raising the temperature to 220°C during 30 minutes and further reacted at 220°C, but the depolycondensation reaction was very slow. After 3 hours, the mean degree of polycondensation of the oligomer was still so high as 3.1. After a further 6 hours, the mean degree of polycondensation of the oligomer was 2.3.

When the reaction of Example 6 is compared with that of Comparative Example 6, it is made clear that the ammonium titanyl oxalate is extremely effective as a catalyst.

EXAMPLE 7

The same autoclave as in Example 1 was charged with pellets (1,100 g) made from polytetramethylene terephthalate injection molding material waste by using an extruder, propylene glycol (456 g) and potassium titanyl oxalate (0.4 g). The mixture was heated under a pressure of 3.0 kg/cm$^2$G under nitrogen gas while raising the temperature to 220°C during 30 minutes. When the temperature reached 220°C, the reaction product had already become homogeneous. The oligomer contained in the reaction product had a mean degree of polycondensation of 1.8.

After the pressure was reduced to atmospheric pressure and the reaction product was cooled to 180°C, to the reaction product were added fumaric acid (580 g) and phthalic anhydride (74 g). The mixture was further reacted at 220°C under atmospheric pressure and subsequently under a reduced pressure for 3 hours to give an unsaturated polyester having an acid value of 14.

The unsaturated polyester thus obtained was dissolved in styrene so as to have 40% of styrene content to give a homogeneous unsaturated polyester resin having a Hazen's number of color larger than 500.

The unsaturated polyester resin thus obtained was mixed with benzoyl peroxide (1.0 PHR), from which a casting plate was made by the conventional method. Test pieces were cut from the transparent casting plate, on which the physical properties were measured (JIS K 6919). The results were as follows:

Barcol hardness: 38
Flexural strength: 11.5 kg/mm$^2$
Modulus in flexure: 331 kg/mm$^2$
Heat deformation temperature: 104°C A reaction product containing oligomer having a mean degree of polycondensation of 1.8 was prepared in the same manner as described above. The reaction mixture was cooled to 180°C and was homogeneously mixed with phosphorous acid (0.4 g) and thereto were added fumaric acid (580 g) and phthalic anhydride (74 g). The mixture was heated to 220°C and further reacted under atmospheric pressure and subsequently under a reduced pressure for 3 hours to give an unsaturated polyester having an acid value of 17.

The unsaturated polyester thus obtained was dissolved in styrene so as to have 40% of styrene content to give an unsaturated polyester resin having a Hazen's number of color smaller than 100. Thus, the addition of phosphorus compound extremely improved the color of the resin.

COMPARATIVE EXAMPLE 7

The same autoclave as in Example 1 was charged with pellets (1,100 g) made from polytetramethylene terephthalate injection molding material waste as used in Example 7 and propylene glycol (456 g). The mixture was heated under a pressure of 3.0 kg/cm$^2$G under nitrogen gas while raising the temperature to 220°C during 30 minutes and further reacted at 220°C. The reaction mixture being turbid became gradually transparent. After 2.5 hours, the oligomer contained in the reaction product had a mean degree of polycondensation of 2.6.

When the reaction of Example 7 is compared with that of Comparative Example 7, it is made clear that the potassium titanyl oxalate is extremely effective as a catalyst.

What is claimed is:

1. A process for producing polyester resin, which comprises depolycondensing 1 mol of polyester waste with 1.05 to 2.0 mols of at least one polyol in the presence of about 0.005 to 0.1% by weight, based on the weight of polyester waste, of at least one titanyl oxalate compound or titanium tartrate compound as a catalyst at a temperature of about 210° to 240°C. for a time sufficient to produce an oligomer, and polycondensing the resulting depolycondensation product with at least one polycarboxylic acid or an anhydride thereof and at least one polyol.

2. The process for producing polyester resin according to claim 1, wherein the titanyl oxalate compound and the titanium tartrate compound are members selected from the group consisting of ammonium titanyl oxalate, lithium titanyl oxalate, sodium titanyl oxalate, potassium titanyl oxalate, magnesium titanyl oxalate, calcium titanyl oxalate, strontium titanyl oxalate, barium titanyl oxalate, manganese titanyl oxalate, cobalt titanyl oxalate, zinc titanyl oxalate, lead titanyl oxalate, ammonium titanium tartrate, lithium titanium tartrate, sodium titanium tartrate, potassium titanium tartrate, magnesium titanium tartrate, calcium titanium tartrate, strontium titanium tartrate, barium titanium tartrate, manganese titanium tartrate, cobalt titanium tartrate, zinc titanium tartrate and lead titanium tartrate.

3. The process for producing polyester resin according to claim 2, wherein the titanyl oxalate compound or the titanium tartrate compound is added in an amount of 0.01 to 0.1% by weight on the basis of the weight of the polyester waste.

4. The process for producing polyester resin according to claim 1, wherein the depolycondensation reaction is carried out by reacting 1 mol of the polyester waste with 1.05 to 2.0 mol of the polyol(s).

5. The process for producing polyester resin according to claim 4, wherein the polyol is a member selected from the group consisting of ethylene glycol, 1,2-propylene glycol, trimethylene glycol, 1,3-butylene glycol, 1,4-butanediol, pentamethylene glycol, 1,6-hexanediol, diethylene glycol, dipropylene glycol, polyethylene glycol, polypropylene glycol, neopentyl glycol, 2,2,4-trimethyl-1,3-pentanediol, 1,4-butenediol, cyclohexanediol, cyclohexanedimethanol, dimethylolbenzene, hydrogenated bisphenols, alkylene oxide addition products of hydrogenated bisphenols, alkylene oxide addition products of bisphenols, alkylene oxide addition products of halogenated bisphenols, trimethylolethane, trimethylolpropane, glycerine, trimethylolbenzene, pentaerythritol, sorbitol, mannitol and thioglycol.

6. The process for producing polyester resin according to claim 1, wherein the polycarboxylic acid or its anhydride is a member selected from the group consisting of orthophthalic acid or its anhydride, isophthalic acid, terephthalic acid, alkylated phthalic acids or their anhydrides, naphthalenedicarboxylic acid, succcinic acid or its anhydride, adipic acid, azelaic acid, sebacic acid, dodecanedicarboxylic acid, tetrahydrophthalic acid or its anhydride, hexahydrophthalic acid or its anhydride, halogenated phthalic acids or their anhydrides, 3,6-endomethylene-1,2,3,6-tetrahydrophthalic acid or its anhydride, chlorendic acid or its anhydride, fumaric acid, maleic acid or its anhydride, citraconic acid, itaconic acid, trimellitic acid or its anhydride and pyromellitic acid or its anhydride.

7. The process for producing polyester resin according to claim 1, wherein the polycondensation reaction is carried out in the presence of at least one phosphorus compound.

8. The process for producing polyester resin according to claim 7, wherein the phosphorus compound is a member selected from the group consisting of hypophosphorus acid, phosphorous acid, phosphoric acid, trimethyl phosphite, triethyl phosphite, triphenyl phosphite, trimethyl phosphate, triethyl phosphate, triphenyl phosphate, diethylphenyl phosphate, trioctyl phosphate, trioctyl phosphite, trioctadecyl phosphate, trioctadecyl phosphite, polyphosphates and polyphosphonates.

9. The process for producing polyester resin according to claim 7, wherein the phosphorus compound is added in an amount of 0.0005 to 0.5% by weight, calculated as the phosphorus atom, on the basis of the weight of the depolycondensation product.

10. The process for producing a saturated polyester resin according to claim 1, wherein both the polycarboxylic acid component of the starting polyester waste and the reactant polycarboxylic acid or its anhydride used in the polycondensation reaction are saturated dicarboxylic acids and both the polyol component of the starting polyester waste and the reactant polyol used in the polycondensation reaction are saturated diols.

11. The process for producing an alkyd resin according to claim 1, wherein the polycarboxylic acid or the polyol which are either the component of the starting polyester waste or the reactant used in the polycondensation reaction is at least trivalent.

12. The process for producing an unsaturated polyester resin according to claim 1, wherein either of the polycarboxylic acid component or polyol component of the starting polyester waste and the reactant polycarboxylic acid or its anhydride or polyol used in the polycondensation reaction is an unsaturated polycarboxylic acid or unsaturated polyol and further the unsaturated polyester obtained by the polycondensation reaction is mixed with at least one vinyl monomer or allyl monomer.

13. The process for producing polyester resin according to claim 1, wherein the polycondensation step is carried out at a temperature of 150° to 190°C. in the presence of a polycondensation catalyst.

14. The process for producing polyester resin according to claim 1, wherein the titanyl oxalate compound or titanium tartrate compound is employed in an amount of about 0.01 to 0.1% by weight.

* * * * *